L. TRABUE.

DOOR HANGER.

APPLICATION FILED MAY 7, 1914.

Reissued June 15, 1915. 13,931.

Witnesses
Robert Farcher
Hazel Owen

Inventor
Luther Trabue.
By Bond & Miller,
Attorneys

THE NORRIS PETERS CO., PHOTO-LITHO., WASHINGTON, D. C.

UNITED STATES PATENT OFFICE.

LUTHER TRABUE, OF GIRARD, ILLINOIS, ASSIGNOR TO THE NEY MANUFACTURING COMPANY, OF CANTON, OHIO, A CORPORATION OF OHIO.

DOOR-HANGER.

13,931. Specification of Reissued Letters Patent. Reissued June 15, 1915.

Original No. 1,064,875, dated June 17, 1913, Serial No. 758,390. Application for reissue filed May 7, 1914. Serial No. 837,080.

*To all whom it may concern:*

Be it known that I, LUTHER TRABUE, a citizen of the United States, residing at Girard, in the county of Macoupin, and State of Illinois, have invented certain new and useful Improvements in Door-Hangers; and I do hereby declare the following to be a full, clear, and exact description of the invention, such as will enable others skilled in the art to which it appertains to make and use the same.

This invention relates to hangers for slidable doors for barns, stables, and other buildings; and it consists in the novel construction and combination of the parts hereinafter fully described and claimed.

Figure 1:
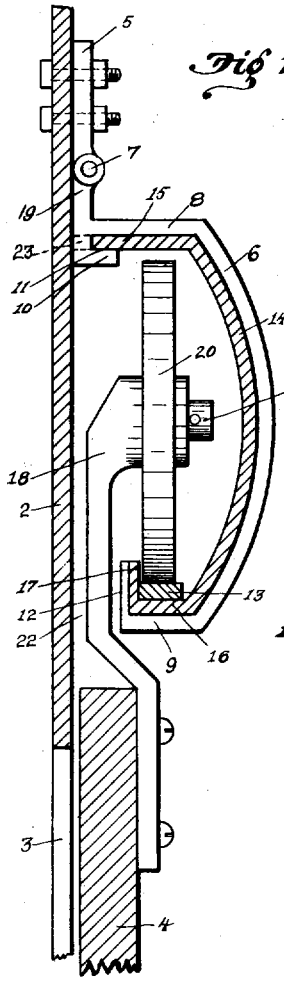
Figure 2:
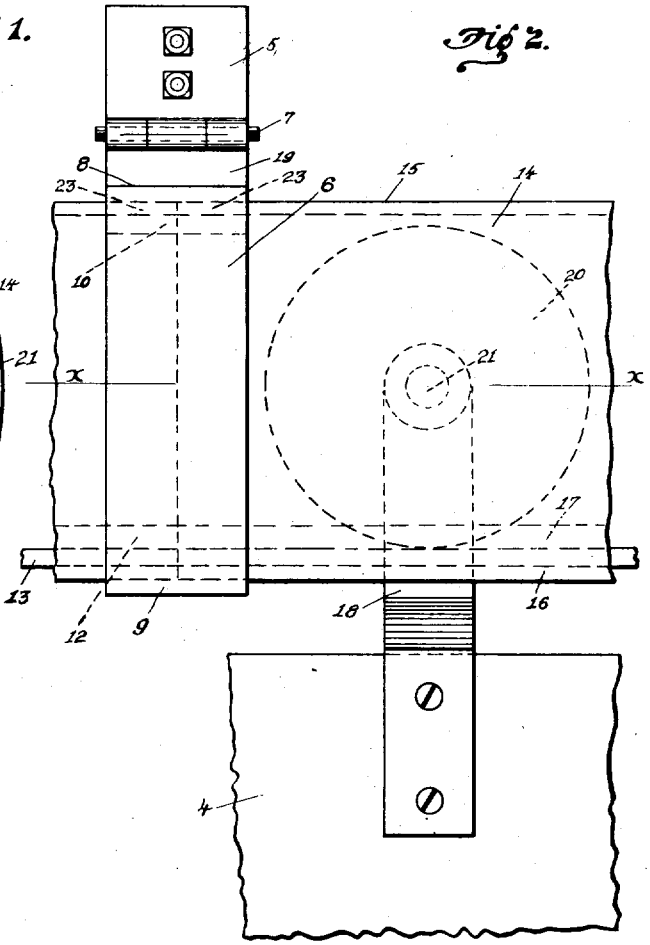
Figure 3:
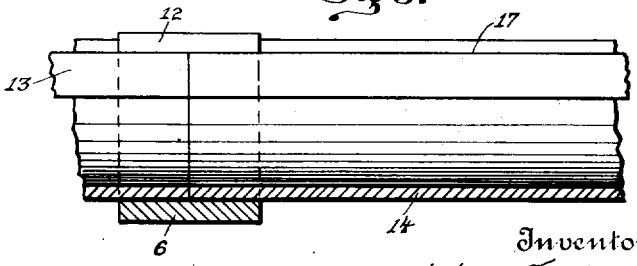

In the drawings, Figure 1 is an end view of a door hanger constructed according to this invention, showing the cover plate and track in section. Fig. 2 is a front view of the same. Fig. 3 is a sectional plan view of the cover and hanger bracket, taken on the line $x$—$x$ in Fig. 2.

The side 2 of the building, such as a barn or stable, has a door opening 3, and 4 is a portion of the door which is slidable over the opening 3. Similar hinge plates 5 are secured to the side 2 above the top of the door and at suitable intervals, and each hinge plate 5 has a hanger bracket 6 pivoted to it by a pin 7. Each bracket has a horizontal top portion 8, and a horizontal bottom portion 9. Each bracket has also an abutment portion 19 which is arranged vertically and crosswise of its top portion 8, and the abutment portion 19 has a horizontal tongue 10 at its lower end, and a guide channel 11, formed between the tongue and the top portion 8. The bottom portion 9 has a vertical tongue 12 which projects upwardly from it.

A cover plate 14 is provided and is formed in sections of suitable length. The cover plate has a horizontal top portion 15 which engages with the channel 11, and it has a horizontal track portion 16, which rests on the bottom portion 9 of the bracket. The track portion has an upwardly projecting flange 17 which is arranged in line with the tongue 12. The sections of the cover plate are arranged with their joints opposite one of the brackets, and the end portions of their flanges 17 are cut away as shown in Fig. 3 so as to fit against the tongue 12. A track bar 13 can be secured in the track portion if desired, but it can be omitted if the plate is strong enough without it.

The door 4 has similar arms 18 secured to it, and each arm has a small wheel 20 journaled on a pin 21 at its upper end. The abutment portions 19 abut against the side of the building, so that a narrow passage 22 is formed between the vertical flanges 17 of the track portion and the side of the building. The arms 18 move in the passage 22, and the wheels run on the track portion 16 inside the cover plate.

The cover plate makes the device snow-proof and bird-proof, and the hanger can be constructed with very little expense and is not liable to stick or get out of order. The door can be moved pivotally on the hinge pin 7, in addition to being moved longitudinally. The portion 15 at the top of the cover plate bears against the side of the barn, and has notches 23 where it engages with the guide channels 11 of the bracket.

What I claim is:

1. In a door hanger, the combination, with a hanger bracket provided at its upper part with means for securing it against a building and having also a horizontal channel, said hanger bracket having also a vertical tongue at its lower part; of a cover plate supported by the said bracket and having a horizontal top portion which engages with the said channel, said cover plate having also a horizontal track portion at its lower part and a flange arranged in line with the said tongue; and an arm for supporting the door, said arm having a wheel which runs in the said track portion.

2. In a door hanger, the combination, with a stationary hinge plate and means for securing said plate against the side of a building, and a hanger bracket pivoted to the hinge plate and provided at its upper part with a horizontal channel and an abutment portion adapted to bear against the side of said building to space the track away from the same, said hanger bracket having also a vertical tongue at its lower part; of a cover plate supported by the said bracket and having a horizontal top portion which engages with the said channel, said cover plate having also a horizontal track portion at its lower part and a flange arranged in line with the said tongue, and an arm for supporting the door, said arm having a wheel which runs in the said track portion.

3. In a door hanger, in combination, a cover plate formed of a plurality of end-abutting sheet metal sections, each section formed with a top portion adapted to bear against the side of a building, and a lower, horizontal, track portion provided at its inner margin with a vertically disposed flange, said top portion and track portion being formed integrally with an intermediate supporting portion curved outwardly, downwardly and thence inwardly from said top portion to said track portion; a bracket provided at its upper part with means for securing it against the side of a building, a bottom portion extending under and supporting the track portion of the cover plate and a flange at the inner end of said bottom portion arranged parallel with the flange portion of said cover plate, and an integral supporting portion extending over the supporting portion of the cover plate and conforming to the shape thereof and connecting said top portion and bottom portion of said bracket, said bracket adapted to extend over, and support and aline the abutting ends of said cover plate sections; and an arm for supporting the door, said arm having a wheel which runs in the said track portion.

In testimony that I claim the above, I have hereunto subscribed my name in the presence of two witnesses.

LUTHER TRABUE.

Witnesses:
E. A. GIBSON,
VIRGINIA MCGHEE.

Copies of this patent may be obtained for five cents each, by addressing the "Commissioner of Patents, Washington, D. C."